REISSUED

United States Patent Office 3,002,844
Patented Oct. 3, 1961

RE 25 884

3,002,844
PIGMENT-PAPER-COATING COMPOSITION
Thomas L. Reiling, Dedham, Mass., assignor to Robert B. Seth, doing business as Boston Chemical Products Company, Boston, Mass.
No Drawing. Filed Dec. 1, 1959, Ser. No. 856,383
5 Claims. (Cl. 106—129)

The present invention relates to the manufacture of coatings for paper, and more particularly, to a coating composition having many of the desired properties and advantages of a so-called "cast" coating.

Cast coatings, which are obtained by casting the coating material on a polished drum and releasing the coating material from the drum to the paper, are used in most instances where smooth, bright, glossy, ink-receptive papers are required. Many thousands of tons of paper having these properties, which are hereinafter referred to as eye-appeal, are required each year for labels, magazine covers, stock for printing advertising matter, and stock for other similar purposes. Such stock is expensive, because its production is slow and the capital outlay required for the machinery necessary for cast coatings is very great. Consequently, the art has long sought suitable substitutes for cast coated paper stock, but to the best of my knowledge, heretofore no such substitute has been available.

It is, therefore, the object of this invention to produce a coating composition which may be applied to paper stock by conventional coating equipment and which provide a sheet of paper stock having the properties of a cast coated sheet.

A further object of this invention is to provide a coating composition for paper stock, which may be applied at greater speed than cast coated compositions, and which will provide a sheet having eye-appeal, as hereinabove defined.

A further object of this invention is to provide a coating for standard fine printing papers which does not require calendering.

Still further objects and advantages of the invention will appear from the following description and appended claims.

The invention is based on the surprising discovery that a composition of matter prepared by intermixing two components, the first consisting of an alkali soluble protein, oil and water in the form of an emulsion, and the second consisting of a water soluble gum, such as glue, a pigment material such as clay or other filler and water results in the formation of a suspension of a protein coated pigment composition having exceptionally good paper coating characteristics. My composition has a desirably high solids content and may be applied to paper stock by conventional paper coating machinery and thereafter dried to a hard, bright, glossy, smooth surface which has improved ink receptivity and varnish holdout, yielding an excellent high gloss print. Because my novel coating composition may be applied to paper webs by conventional paper coating machinery, paper coated in accordance with my process may be coated at much greater speeds than paper coated with the so-called casting process.

The advantages of using an emulsion of water and oil in combination with an alkali soluble protein to provide a coating having improved opacity and brightness, were first taught by Kress et al., U.S. Patent #2,339,707. However, the Kress invention is subject to several serious limitations, in that the oil-water-protein ratios must be such that the solids content of the coating is insufficient to enable the coating to be used economically in modern coating machinery. The addition of solids to the protein, petroleum, water emulsion recommended by Kress results in an appreciable loss of brightness, opacity, and gloss when as little as 3% of pigment or filler is incorporated in the mixture.

I have found that the addition of a gum, such as animal glue, vegetable glue, or other water soluble gum, and a pigment, when first mixed together and thereafter added to a protein, oil, water emulsion preserves the desired properties of opacity, brightness, printability, and gloss obtained by using an alkali soluble protein, oil and water emulsion, and at the same time, enhances the scuff-resistant properties and provides solids for the composition, so that it may be used in conventional coating machinery.

In this specification I use the words, "paper pigment" and "paper filler" interchangeably. By these words I mean to include the finely subdivided solid materials which are used for surface treating of paper sheeting, including but by no means limited to chalk, talc, calcium carbonate, clay, walnut flour, titanium, dioxide, satin white and the like. These paper pigments are distinguishable from the coloring pigments, both in purpose and in utility, since the coloring pigments such as iron oxide, umber, carbon black, copper oxide and the like would so color the emulsion as to make it of little value in paper coating. Also, these coloring pigments would provide little if any filler action on the surface of the raw paper sheet material and therefore are inoperable for the purpose of this invention.

Going into more detail, I have found that by forming an emulsion of a hydrocarbon, water, and a water insoluble protein and thereafter adding a paper pigment of the type heretofore defined, water and a gum, such as animal glue, I provide a surface coating for papers which is smooth, highly ink-receptive, has gloss and brightness characteristics which are comparable to the most expensive cast coatings, and is more scuff resistant (i.e. resistant to marring or surface deformation, when brought in contact with or abraded by foreign materials), than are the most expensive, heavily pigmented paper coatings. I have found that an alkali soluble protein will precipitate as fined particles and adhere to the surface of the pigment and change the character of the pigment surface from a dull, semi-translucent and extremely ink-receptive surface to a surface having high gloss, excellent opacity and controlled ink receptivity. The protein particles which adhere to the pigment particles and co-precipitate onto the surface of the paper when the emulsion is broken, provide a paper coating having the desired characteristics. Furthermore, unlike the usual pigmented coatings, the coating compositions of my invention are more resistant to the deep penetration of oil or varnish present in ink, and thereby reduce the amount of ink required for surface coverage and reduce the drying time of the ink required for surface coverage of the sheet. Paper coated with the compositions of my invention resists the tendency of ink to show through the paper, because of higher opacity of the surface and because less ink is required to accomplish the same result, and this latter property, the ability to retard ink absorption, I refer to as improved varnish hold out.

My composition comprises between 5 and 20 parts of an alkali soluble-water insoluble protein, such as alpha protein or soya protein, between 80 and 95 parts of water, between 5 and 60 parts of a liquid hydrocarbon, and between 10 and 90 parts of a gum pigment mixture, where the mixture is made up of between 5 and 75 parts of paper pigment, between 5 and 75 parts of water soluble gum, and between 40 and 95 parts of water. The soluble gum, which I prefer to use is animal glue, and I prefer to use soya protein as the water insoluble protein, however, I find that casein can also be used to good advantage. The liquid hydrocarbon which is used, and which I prefer to use is diesel oil, although kerosene or higher boiling liquid hydrocarbon materials can be used in practising my invention.

The following examples will serve to illustrate preferred embodiments of my invention and the methods followed in the practice thereof.

*Example I.*—A paper coating composition was made up by dissolving 20 pounds of alpha protein in ammonial solution. The water content of the solution was adjusted so that the solids therein amount to 20% of the solution. This solution is then allowed to cool to room temperature. Twenty pounds of the solution is then weighed out of the mass and twelve pounds of glue, animal glue, is added and the mixture is stirred until the glue is dissolved. To this mixture 10 pounds of diesel oil is added, and the mixture is agitated by a high speed mixer. In a separate container, 8 pounds of clay, 8 pounds of potato dextrin, 16 pounds of water are mixed together with agitation and heat and are heated to thoroughly intermix the potato dextrin with the pigment. The mass is then allowed to cool to room temperature. The mixture of potato dextrin, clay and water are then added to the protein, glue and oil emulsion, while the mass is being agitated by a high-speed mixer, such as a Lightning mixer. After the addition, the mass is cooled, and it is then ready to apply to paper with standard coating equipment.

*Example II.*—About 200 pounds of casein protein was weighed into about 900 pounds of water. To enhance the swelling of protein, approximately 7 pounds of borax and about 20 pounds of 26° Bé. $NH_4OH$ was added. During the addition the entire mass was being agitated by three high-speed mixers, and the mass was heated to 140° F. The agitation continued for about 45 minutes with the heat turned off, and the temperature rose to 150° F. and then proceeded to cool to 98° F. This mixture was added slowly to 500 pounds of petroleum hydrocarbon (diesel oil) with a flash point of 162° F. The mass was agitated during this addition.

Simultaneously, a second mixture consisting of a water solution of gum and pigment and comprising 700 pounds of water, 100 pounds of calcium carbonate, 100 pounds of talc, 100 pounds of titanium dioxide and 200 pounds of clay and approximately 900 pounds of animal glue was prepared. This second mixture was added to the protein, oil, and water mixture and the mixing was continued until a creamy, smooth, uniform pigmented emulsion resulted. The resulting emulsion was applied to a base stock with a #20 Myer rod, and the paper was dried. The resulting product had good opacity, brightness, and ink-receptivity, and a gloss favorably comparable with cast coatings.

Any of a wide range of hydrocarbons, including the petroleum distillates may be used for the purpose of my invention. I prefer to use the petroleum distillates which are colorless hydrocarbons and have flash points between about 100° F. and 250° F. Of course, petroleum distillates or other hydrocarbons having higher or lower flash points can be used. Although a colorless hydrocarbon is preferred, I find that hydrocarbons having small amounts of color can also be used, providing the color is not so intense as to effect the brightness of the coated paper.

The pigments which are used should be selected from materials having particle size no greater than 100 microns since materials having larger particle sizes are difficult to coat smoothly on the surface of paper. Paper pigments, such as calcium carbonate, chalk, or talc can be used alone or in combination with each other. Another suitable pigment is walnut flour.

The order of adding the pigment to the emulsion is critical. It must be added with the water soluble gum (i.e. the animal glue) as the mass is being agitated, so that the protein will precipitate on and adhere to the surface of the pigment.

Certain emulsifying agents such as ammonium oliate or the like may be used to advantage in preparing the emulsions in accordance with my procedure. However, these materials are not essential, and apart from facilitating the emulsification of oil and water, they do not enhance the compositions made in accordance with my invention. Borax and/or sodium hydroxide, or other alkali materials may be added to solubilize the protein where water insoluble proteins are used, and these alkali materials provide sufficient surface activity between the oil and water to aid emulsification of the ingredients.

The ratio of water soluble gums to protein can be varied from 10% to 150%, depending upon the results required. The amount of water soluble gum in relation to the amount of pigment must be at least 20% of gum to pigment. Other gums, such as methyl cellulose, polyvinyl alcohol and the like can be used, and other protein material besides casein and soya flour can be used.

The physical and chemical nature of this composition is not clearly understood. It is believed that the oil-protein-water mixture results in the formation of small, individual particles of spongy protein, which readily accept ink. The addition of glue to the pigment causes the pores of the pigment to be closed, thereby allowing the spongy protein to coat the surface of the pigment, resulting in a coating which is essentially this spongy protein material, which gives the brightness, opacity, and other desired properties, including gloss, and printability. It has been found that the coating has the ability to readily accept ink and also has good varnish hold out, yielding an excellent high-gloss print and reducing the amount of ink required for complete coverage.

Having thus described my invention, I claim:

1. A paper coating composition which consists essentially of a suspension of a paper pigment and finely subdivided particles of protein in a liquid hydrocarbon-water emulsion, said protein and pigment forming a co-precipitate on the breaking of the emulsion with the particles of protein adhering to the pigment, said suspension consisting essentially of a dispersion of from 5 to 20 parts of an alkali soluble water insoluble protein selected from the group consisting of alpha protein, soya protein and casein and mixtures and equivalents thereof, between 80 and 95 parts of water, between 5 and 60 parts of a liquid hydrocarbon having a flash point between 100° F. and 250° F. and between 10 and 95 parts of a gum pigment mixture where said gum pigment mixture is made up of between 5 and 75 parts of a paper pigment, between 5 and 75 parts of a soluble gum selected from the group consisting of animal glue, methyl cellulose and polyvinyl alcohol and mixtures and equivalents thereof and between 40 and 95 parts of water.

2. A pigmented paper coating composition comprising a co-precipitate of pigment and protein from a suspension which is made up essentially by preparing a first mixture of an alkali soluble protein selected from the group consisting of alpha protein, soya protein and casein and mixtures and equivalents thereof, a liquid petroleum hydrocarbon having a flash point between 100° F. and 250° F. and water in the ratio of 5 to 20 parts of alkali soluble protein, between 5 and 60 parts of liquid hydrocarbon, and between 80 and 95 parts of water, preparing a second mixture of paper pigment, water soluble gum selected from the group consisting of animal glue, methyl cellulose and polyvinyl alcohol and mixtures and equivalents thereof and water in the ratio of 5 and 75 parts of pigment, 5 and 75 parts of gum, and 40 to 95 parts of water, adding the second mixture to the first and agitating the mass to form an emulsion suspension from which the co-precipitate is yielded when the emulsion is broken.

3. The product of claim 1 in which the pigment has a particle size of less than 100 microns.

4. The product of claim 2 in which the pigment has a particle size of less than 100 microns.

5. A process of manufacturing a coating composition for paper which comprises forming a first mixture by adding 5 to 20 parts of an alkali soluble protein selected from the group consisting of alpha protein, soya protein and casein to between 80 and 95 parts of water, adjusting the pH of the mixture to above 7, agitating the mixture while adding between 5 and 60 parts of a liquid hydrocarbon having a flash point of between 100° F. and 250° F. to form an emulsion, forming a second mixture by adding 5 to 75 parts of a water soluble gum selected from the group consisting of animal glue, methyl cellulose and polyvinyl alcohol to between 40 and 95 parts of water and adding 5 to 75 parts of a paper pigment and adding the second mixture to the first mixture to form a pigmented emulsion.

References Cited in the file of this patent

UNITED STATES PATENTS

| | | |
|---|---|---|
| 175,683 | Fetzer | Apr. 4, 1876 |
| 1,816,978 | Knight | Aug. 4, 1931 |
| 2,537,055 | Huon et al. | Jan. 9, 1951 |